(12) United States Patent
Ghannam et al.

(10) Patent No.: US 9,004,578 B1
(45) Date of Patent: Apr. 14, 2015

(54) UNIVERSAL VEHICLE SENSOR BRACKET

(71) Applicant: Ford Global Technologies, LLC, Dearborn, MI (US)

(72) Inventors: Mahmoud Yousef Ghannam, Canton, MI (US); Jose Alberto Moctezuma Garcia, Mexico City (MX); Cecilia Oddett Paredes Mancilla, Nicolas Romero (MX); Ira Goldberg, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/170,664

(22) Filed: Feb. 3, 2014

(51) Int. Cl.
*B60R 13/04* (2006.01)
*G01D 11/30* (2006.01)

(52) U.S. Cl.
CPC ..................... *G01D 11/30* (2013.01)

(58) Field of Classification Search
CPC ...................................... G01D 11/30
USPC ................ 248/56, 71; 340/435, 932.2, 693.9; 296/191
See application file for complete search history.

(56) References Cited

U.S. PATENT DOCUMENTS

| | | | |
|---|---|---|---|
| 6,203,366 B1 | 3/2001 | Muller et al. | |
| 7,616,102 B2 * | 11/2009 | Kudelko et al. | 340/435 |
| 2005/0242933 A1 | 11/2005 | Loh | |
| 2006/0267359 A1 * | 11/2006 | Blake | 293/120 |
| 2007/0120657 A1 * | 5/2007 | Schofield et al. | 340/435 |
| 2008/0117080 A1 * | 5/2008 | Kudelko et al. | 340/932.2 |
| 2008/0179900 A1 * | 7/2008 | Hartley et al. | 293/117 |
| 2011/0006916 A1 * | 1/2011 | Toledo | 340/932.2 |

FOREIGN PATENT DOCUMENTS

| | | |
|---|---|---|
| DE | 19621964 A1 | 12/1997 |
| KR | 2009000669 A | 1/2009 |

* cited by examiner

*Primary Examiner* — Lori L Lyjak
(74) *Attorney, Agent, or Firm* — Jason C. Rogers; Bejin Bieneman PLC

(57) ABSTRACT

A bracket for use in a vehicle includes a base configured to be welded to an interior surface of a vehicle fascia and configured to receive a sensor. The base has a configuration that generally matches a shape of at least a portion of the interior surface. An orientation of the sensor is based at least in part on an orientation of the base relative to the interior surface of the vehicle fascia.

16 Claims, 4 Drawing Sheets

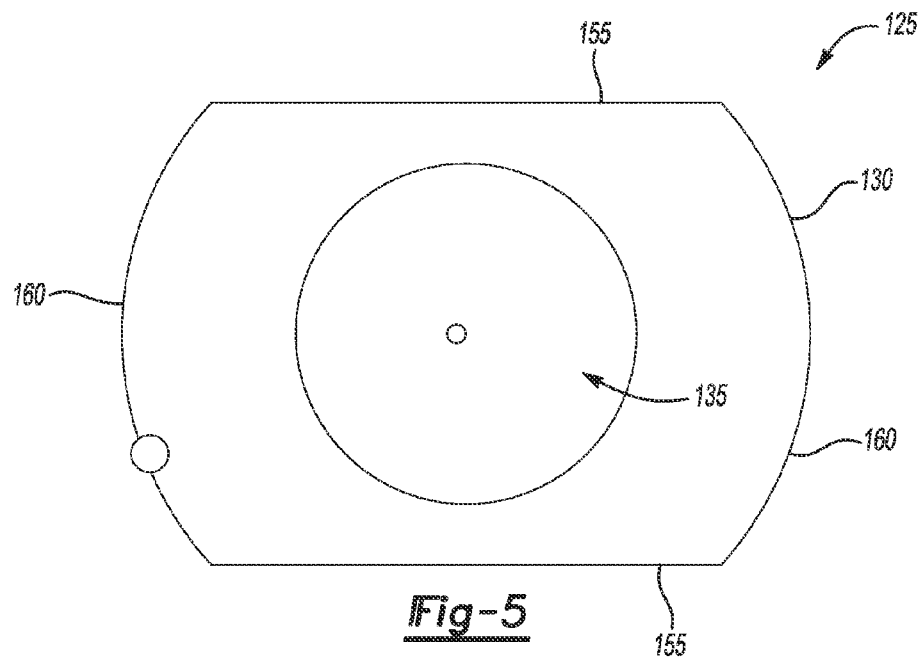
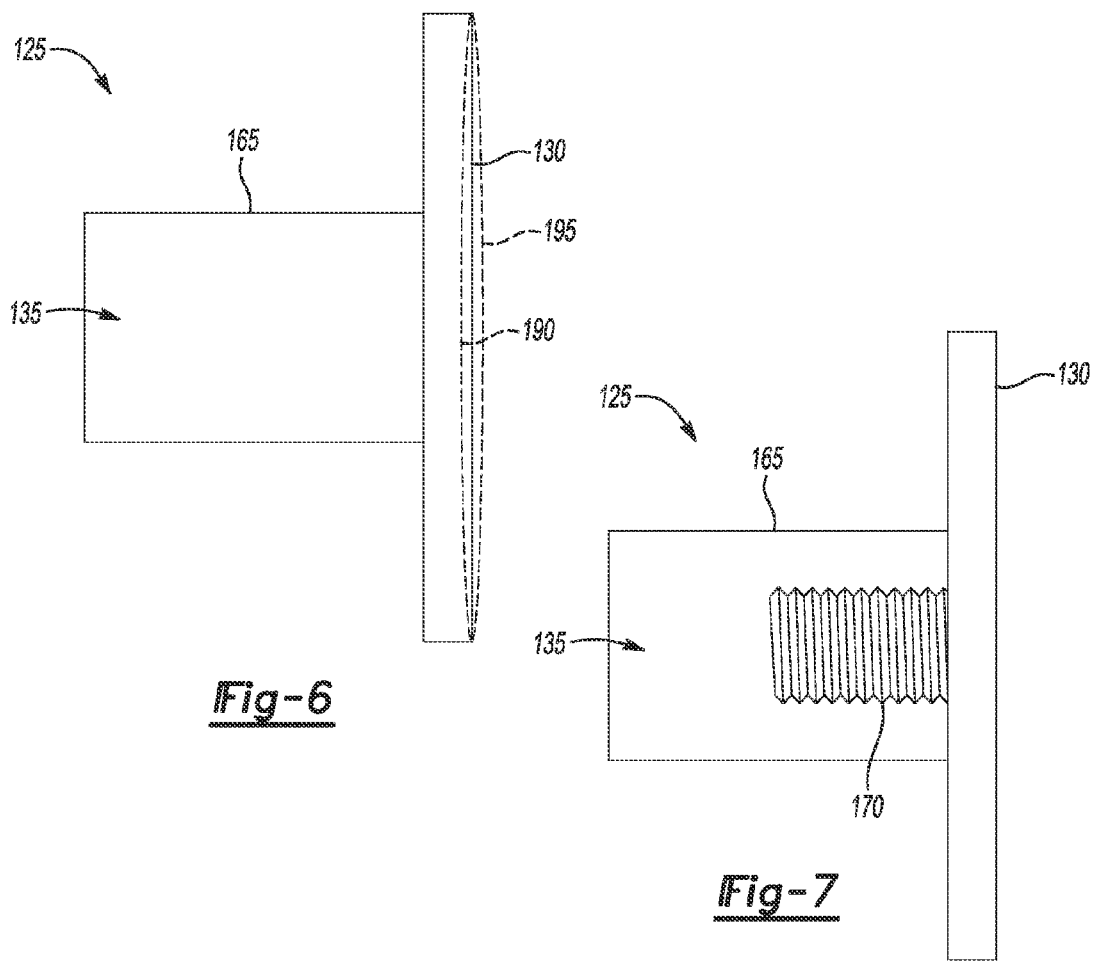

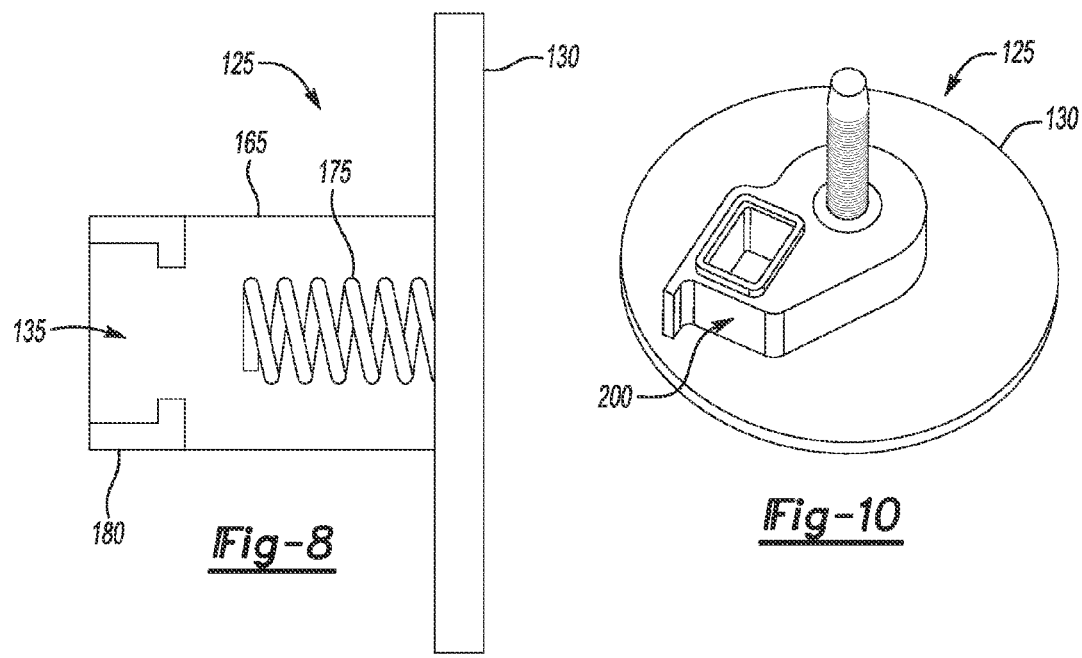
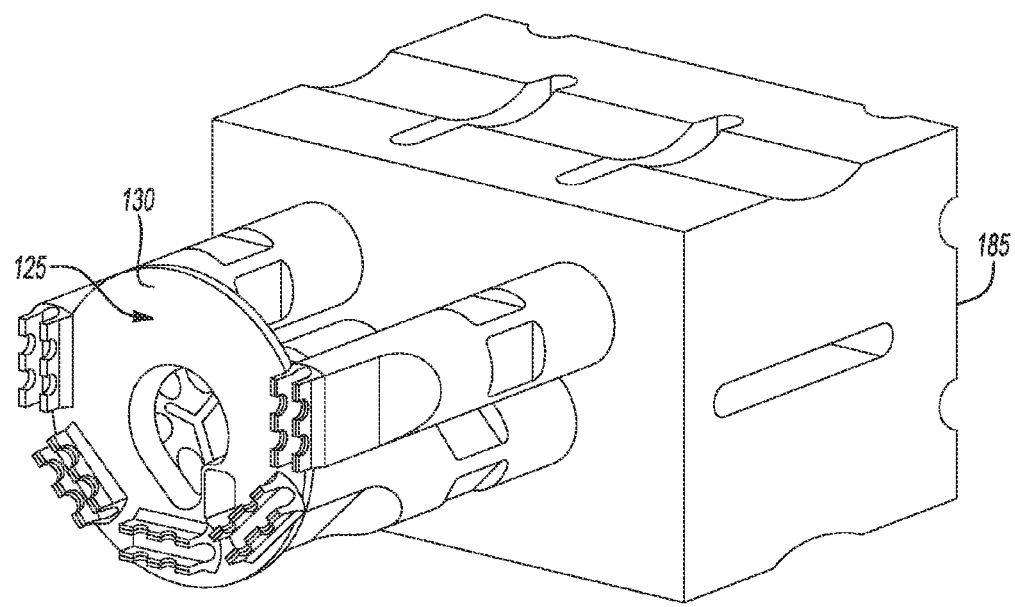

UNIVERSAL VEHICLE SENSOR BRACKET

BACKGROUND

Sensors are located throughout modern automobiles. It can be a challenge, however, to mount sensors directly to a vehicle fascia. An interior surface of the fascia is often contoured, and the process of securing a sensor to the fascia can damage the outer surface of the fascia, which would greatly reduce the aesthetic appeal of the vehicle. Furthermore, non-symmetrical sensor orientations require a different bracket configuration for each sensor. Each bracket configuration must satisfy stringent design requirements to ensure proper clearance of the sensor relative to surrounding parts so that the sensor can function as intended.

BRIEF DESCRIPTION OF THE DRAWINGS

FIG. 5 is a top view of an exemplary bracket having a smaller base.

FIG. 6 is a cross-sectional side view of one exemplary bracket.

FIG. 7 is a cross-sectional side view of an exemplary bracket having an over-molded stud.

FIG. 8 is a cross-sectional side view of an exemplary bracket having a spring and a locking mechanism.

FIG. 9 is a perspective view of an exemplary welding tool for welding the bracket to the vehicle fascia.

FIG. 10 is a perspective view of another exemplary bracket having a positioning feature for orienting the bracket relative to the interior surface of the fascia.

DETAILED DESCRIPTION

An exemplary vehicle includes a bracket, configured to receive a sensor, that has a base configured to be welded to an interior surface of a vehicle fascia. The base has a configuration that generally matches a shape of at least a portion of the interior surface. An orientation of the sensor is based at least in part on an orientation of the base relative to the interior surface of the vehicle fascia. The same type of bracket can be used to attach sensors to different parts of the fascia, including at the front, rear, left, and right sides of the vehicle thus eliminating the need for multiple bracket designs for sensors located at different parts of the vehicle.

The vehicle components shown in the FIGS. may take many different forms and include multiple and/or alternate components and facilities. The exemplary components illustrated are not intended to be limiting. Indeed, additional or alternative components and/or implementations may be used.

Figure 1:
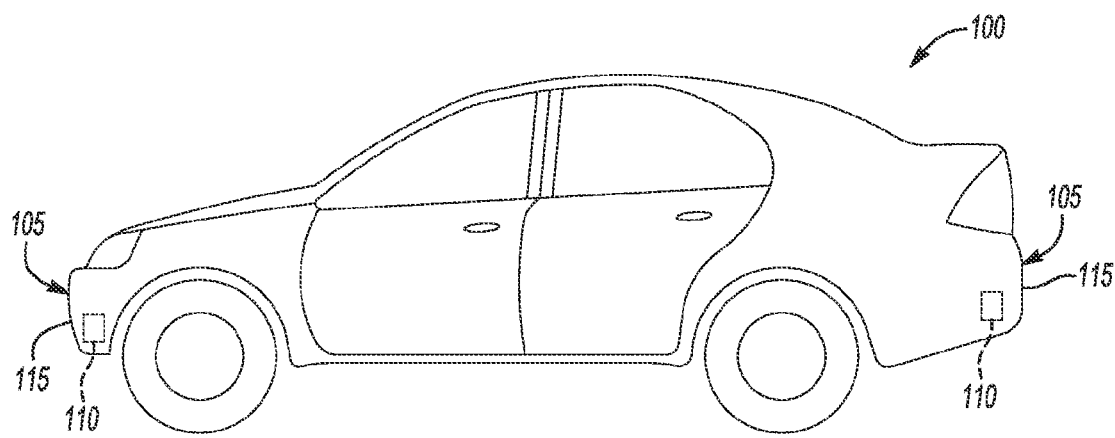
FIG. 1 illustrates an exemplary vehicle having a sensor mounted to a fascia via a universal sensor bracket.

As illustrated in FIG. 1, a vehicle 100 includes a fascia 105 and sensors 110. The vehicle 100 may include any type of passenger or commercial vehicle. Examples of vehicles 100 may include a car, truck, sport utility vehicle, crossover vehicle, bus, train, airplane, boat, or the like.

The fascia 105 may refer to a cover located at the front and/or rear ends of the vehicle 100. The fascia 105 may be generally formed from a plastic material, and in some instances, the fascia 105 may have aesthetic qualities that define the shape of the front- and/or rear-ends of the vehicle 100. The fascia 105 may include an interior surface 115 (see FIG. 2) and an exterior surface 120. The interior surface 115 may be generally hidden from ordinary view (i.e., inward-facing relative to the vehicle 100) while the exterior surface 120 may generally be outward-facing relative to the vehicle 100. Further, the fascia 105 may be used to hide certain parts of the vehicle 100, such as the bumper, from ordinary view. The fascia 105 may define various openings for, e.g., headlamps, a grille, tail lamps, fog lamps, etc.

The sensors 110 may refer to any number of devices configured to collect data for use in operating the vehicle 100. One or more sensors 110 may be used to detect the presence of pedestrians in the path of the vehicle 100, assist in automated or manual parking procedures, and or collect data associated with the autonomous operation of the vehicle 100. The sensors 110 may be mounted directly to the interior surface 115 of the fascia 105 via a bracket 125, as discussed in greater detail below. While two sensors 110 are shown, one near the front of the vehicle 100 and one near the rear of the vehicle 100, the vehicle 100 may include any number of sensors 110. For instance, some implementations may include multiple sensors 110, each mounted to the interior surface 115 of the fascia 105, spaced along the front- and/or rear-ends of the vehicle 100.

Figure 2:
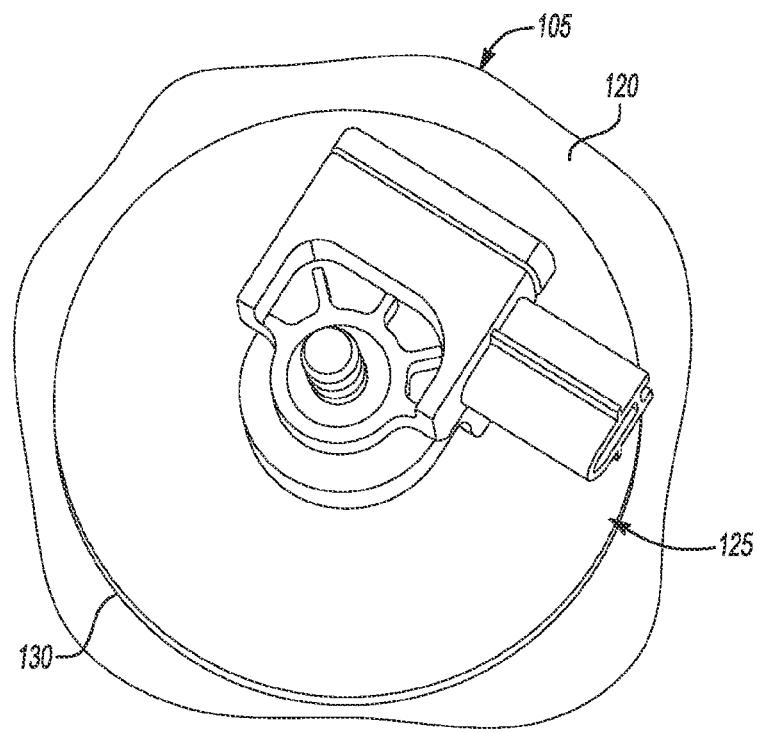
FIG. 2 illustrates one exemplary universal sensor bracket securing a sensor to a vehicle fascia.

FIG. 2 illustrates one possible bracket 125 for securing a sensor 110 to the fascia 105. As shown, the bracket 125 includes a base 130 and a sensor-receiving area 135. The bracket 125, as shown in FIG. 2, is welded directly to the interior surface 115 of the fascia 105. The base 130 shown in FIG. 2 has a generally circular configuration, and may be orientated to facilitate operation of the sensor 110. That is, the base 130 may be rotated and attached to the interior surface 115 of the fascia 105 to point the sensor 110 in a particular direction. Thus, the same type of bracket 125 may be used for sensors 110 located on the front, rear, left, and right sides of the vehicle 100.

Figure 3:
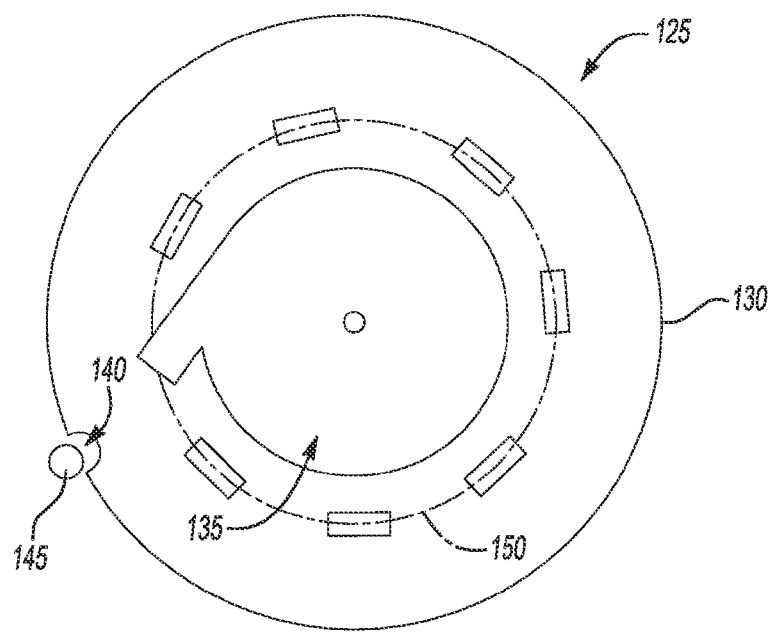
FIG. 3 is a top view of the exemplary bracket of FIG. 2.

FIG. 3 is a top view of the bracket 125 shown in FIG. 2. As shown, the base 130 has a generally circular configuration. The sensor-receiving area 135 may be shaped to receive the sensor 110 and secure the sensor 110 to the base 130. Therefore, the sensor-receiving area 135 may define an opening that corresponds to the shape of at least a portion of the sensor 110. Moreover, in the example sensor 110 shown in FIG. 3, the base 130 defines an opening 140 configured to mate with an orientation pin 145. The orientation pin 145 may be located on the interior surface 115 of the fascia 105. The orientation of the sensor 110 may be based on the location of the orientation pin 145. As mentioned above, the same type of bracket 125 may be used for sensors 110 located at different parts of the vehicle 100. The sensor 110 may be attached to each base 130 in a similar manner as defined by the sensor-receiving area 135. The orientation pin 145, however, may ensure that the sensor 110 is properly oriented based on, e.g., the part of the interior surface 115 of the fascia 105 where the sensor 110 is located. Thus, by aligning the base 130 with the orientation pin 145, a sensor 110 located at the front of the vehicle 100 may generally point in a forward direction and a sensor 110 located at the rear of the vehicle 100 may generally point in a rearward direction.

Figure 4:
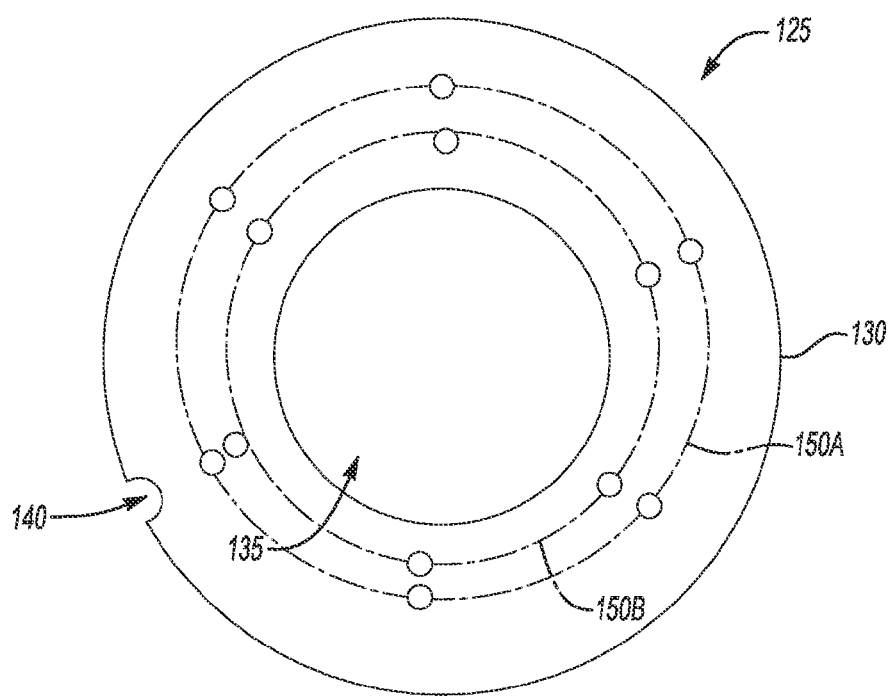
FIG. 4 is a top view of one exemplary bracket having different weld paths.

The bracket 125 shown in FIG. 3 may be welded directly to the interior surface 115 of the fascia 105. One possible weld path 150 is shown. Alternatively, referring now to FIG. 4, multiple weld paths 150 may be used to attach the bracket 125 to the interior surface 115 of the fascia 105. Two weld paths 150 are shown in FIG. 4. A first weld path 150A may be concentric with a second weld path 150B. Referring to the implementations of FIGS. 3 and 4, the weld path 150 may be presented on the interior surface 115 of the fascia 105 in addition to or as an alternative to the orientation pin 145. Presenting the weld path 150 on the interior surface 115 may help properly align the bracket 125 prior to welding to the interior surface 115.

FIG. 5 illustrates a bracket 125 having a smaller base 130, that is, a base 130 with a smaller surface area. The bases 130 shown in FIGS. 1-4 have a generally circular configuration. The base 130 may have other configurations to accommodate unique configurations of the interior surface 115 of the fascia 105. One way to accommodate unique configurations of the interior surface 115 is to provide a base 130 with a smaller surface area, such as the base 130 shown in FIG. 5. As shown, the base 130 may have two relatively flat edges 155 extending between two rounded edges 160. The base 130 of the bracket 125 shown in FIG. 5 further defines the opening 140 for receiving the orientation pin 145.

FIG. 6 is a cross-sectional side view of one exemplary bracket 125 where the sensor-receiving area 135 is defined by a wall 165 disposed on the base 130. In some instances, the wall 165 may be integrally formed with the base 130. The wall 165 may have a sufficient length to receive and retain the sensor 110. The wall 165 as shown in FIG. 6 may have a generally cylindrical configuration that at least partially encloses the sensor-receiving area 135. The wall 165 may be at least partially hollow in some implementations and a solid cylinder in other implementations.

Moreover, the base 130 of the bracket 125 may have different configurations to match, e.g., the interior surface 115 of the fascia 105. For example, the dashed lines in FIG. 6 represent different possible configurations of the base 130. The dashed convex line 190 may represent the configuration of the base 130 for instances where the interior surface 115 of the fascia 105 has a generally concave shape. Alternatively, the dashed concave line 195 may represent the configuration of the base 130 for instances where the interior surface 115 of the fascia 105 has a generally convex shape.

Referring now to FIG. 7, the bracket 125 includes a stud 170 extending from the base 130. The stud 170 may be integrally formed with the base 130, and in some possible approaches, the stud 170 may be overmolded onto the base 130. Moreover, the stud 170 may be threaded to retain the sensor 110 in the sensor-receiving area 135. For instance, the stud 170 may define outer threads that are configured to mate with threads on an inner surface of the sensor 110.

FIG. 8 illustrates one implementation where the wall 165 includes a locking mechanism 180 for retaining the sensor 110. A spring 175 may be located in the sensor-receiving area 135 (e.g., inside the wall 165) configured to bias the sensor 110 toward the locking mechanism to secure the sensor 110 to the bracket 125. When a portion of the sensor 110 is inserted into the wall 165, the spring 175 may push that portion of the sensor 110 toward the locking mechanism 180. Removing the sensor 110 from the bracket 125 may include pushing the sensor 110 against the spring 175 and rotating the sensor 110 to clear the locking mechanism 180.

FIG. 9 is a perspective view of an exemplary welding tool 185 for welding the bracket 125 to the fascia 105. The welding tool 185 may include various attachments for welding the bracket 125 to the interior surface 115 of the fascia 105. One attachment may allow the welding tool 185 to attach brackets 125 having a circular base 130 to the interior surface 115 while another attachment may allow the welding tool to attach brackets 125 with a non-circular base 130, such as the bracket 125 shown in FIG. 5. The welding tool 185 may be configured to orient the bracket 125 relative to the orientation pins 145. Therefore, the same type of welding tool 185 may be used to weld some or all of the brackets 125 used in the vehicle 100 to the interior surface 115 of the fascia 105, eliminating the need for different types of welding tools based on the location of the sensor 110.

FIG. 10 illustrates an exemplary bracket 125 having a positioning feature 200 instead of the opening 140 discussed above. The positioning feature 200 may be integrally formed with the base 130, and in some instances, may be keyed to fit in the welding tool 185 in a particular way so that the bracket 125 is welded to the interior surface 115 of the fascia 105 in the correct orientation and in the correct location. The positioning feature 200 may be used instead of or in addition to the opening 140 and orientation pin 145 discussed above. When using the positioning feature 200, however, the orientation pin 145 may be omitted from the interior surface 115 of the fascia 105.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bracket comprising:
a base configured to be welded to an interior surface of a vehicle fascia and configured to receive a sensor, the base having a configuration that generally matches a shape of at least a portion of the interior surface;
wherein an orientation of the sensor is based at least in part on an orientation of the base relative to the interior surface of the vehicle fascia; and
a wall disposed on the base and defining a sensor receiving area, the wall having a locking mechanism for retaining the sensor.

2. The bracket of claim 1, wherein the wall is integrally formed with the base.

3. The bracket of claim 1, further comprising a spring disposed in the sensor receiving area and configured to bias the sensor toward the locking mechanism.

4. The bracket of claim 1, further comprising a stud disposed on the base and configured to receive the sensor.

5. The bracket of claim 4, wherein the stud is overmolded onto the base.

6. The bracket of claim 4, wherein the stud is threaded.

7. The bracket of claim 1, wherein the base has a generally circular configuration.

8. The bracket of claim 1, wherein the base defines an opening for receiving an orientation pin disposed on the fascia to position the base relative to the fascia, and wherein an orientation of the sensor is based at least in part on a location of the orientation pin.

9. A vehicle comprising:
a fascia having an interior surface and an exterior surface;
a sensor; and
a bracket welded directly to the interior surface of the fascia, the bracket having a base with a configuration that generally matches a shape of at least a portion of the interior surface of the fascia;
wherein the sensor is disposed on the bracket and an orientation of the sensor is based at least in part on an orientation of the base relative to the interior surface, wherein the orientation of the base is based at least in part on a positioning feature integrally formed with the base;
wherein the bracket includes a wall disposed on the base and defining a sensor receiving area, wherein the wall includes a locking mechanism for retaining the sensor.

10. The vehicle of claim 9, wherein the wall is integrally formed with the base.

11. The vehicle of claim 9, wherein the bracket includes a spring disposed in the sensor receiving area and configured to bias the sensor toward the locking mechanism to secure the sensor to the bracket.

12. The vehicle of claim 9, wherein the bracket includes a stud disposed on the base and configured to receive the sensor.

13. The vehicle of claim 12, wherein the stud is overmolded onto the base.

14. The vehicle of claim 12, wherein the stud is threaded.

15. The vehicle of claim 9, wherein the base has a generally circular configuration.

16. A vehicle comprising
a fascia having an interior surface and an exterior surface;
a first sensor;
a second sensor;
a first bracket welded directly to the interior surface of the fascia; and
a second bracket welded directly to the interior surface of the fascia;
wherein the first bracket and the second bracket each have a base having a configuration that generally matches at least a portion of the interior surface of the fascia and a wall disposed on the base and defining a sensor receiving area, wherein the wall of the first bracket includes a first locking mechanism for retaining the first sensor and the wall of the second bracket includes a second locking mechanism for retaining the second sensor;
wherein the first sensor is disposed on the first bracket and an orientation of the first sensor is based at least in part on an orientation of the first bracket relative to the interior surface and wherein the second sensor is disposed on the second bracket and an orientation of the second sensor is based at least in part on an orientation of the second bracket relative to the interior surface.

\* \* \* \* \*